(12) United States Patent
Becker et al.

(10) Patent No.: US 7,632,181 B2
(45) Date of Patent: Dec. 15, 2009

(54) HARVESTED CROP PROCESSING UNIT WITH NUMBER OF CIRCULATION CIRCUITS DEPENDING ON THROUGHPUT

(75) Inventors: Klaus Becker, East Moline, IL (US); Martin Büermann, Haunsheim (DE); Klaus Braunhardt, Ottumwa, IA (US); Peter Pirro, Wallhaben (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/128,340

(22) Filed: May 28, 2008

(65) Prior Publication Data
US 2009/0011807 A1 Jan. 8, 2009

(30) Foreign Application Priority Data
Jul. 3, 2007 (DE) .................. 10 2007 030 866

(51) Int. Cl.
*A01F 7/06* (2006.01)
*B02B 3/06* (2006.01)

(52) U.S. Cl. ........................................... 460/66
(58) Field of Classification Search .............. 460/66, 460/60, 68, 69, 70, 80, 84, 108
See application file for complete search history.

(56) References Cited

U.S. PATENT DOCUMENTS

| | | | | |
|---|---|---|---|---|
| 3,464,419 A | | 9/1969 | Knapp et al. | |
| 3,529,645 A | * | 9/1970 | Pauw et al. | 241/101.2 |
| 3,827,443 A | * | 8/1974 | Drayer | 460/16 |
| 3,828,793 A | * | 8/1974 | Gochanour | 460/70 |
| 3,982,549 A | * | 9/1976 | De Pauw et al. | 460/67 |
| 4,148,323 A | * | 4/1979 | McMillen et al. | 460/70 |
| 4,175,568 A | * | 11/1979 | Nooyen | 460/69 |
| 4,244,380 A | * | 1/1981 | DePauw et al. | 460/108 |
| 4,248,248 A | * | 2/1981 | De Busscher et al. | 460/68 |
| 4,250,896 A | * | 2/1981 | Wagstaff et al. | 460/70 |
| 4,254,780 A | * | 3/1981 | Powell et al. | 460/66 |
| 4,258,726 A | * | 3/1981 | Glaser et al. | 460/109 |
| 4,273,138 A | * | 6/1981 | Pauli | 460/79 |

(Continued)

FOREIGN PATENT DOCUMENTS

DE        3537959 A1        5/1987

(Continued)

OTHER PUBLICATIONS

European Search Report dated Oct. 23, 2008 (5 pages).

*Primary Examiner*—Árpád Fábián-Kovács
(74) *Attorney, Agent, or Firm*—Taylor & Aust, P.C.

(57) ABSTRACT

A harvested crop processing unit with a rotor and a rotor housing enclosing the rotor, that includes a cover element under which a first group of helically shaped guide rails and a second group of helically shaped guide rails are attached, where the guide rails of the two groups follow each other alternately and are provided with a leading end and a trailing end in the direction of rotation of the rotor and the guide rails of the first group are arranged offset to the rear of the guide rails of the second group in the direction of rotation of the rotor. The trailing ends of the guide rail of the first group are directed at the leading end of the guide rails of the second group following in the axial direction of the rotor housing.

13 Claims, 7 Drawing Sheets

U.S. PATENT DOCUMENTS

| | | | |
|---|---|---|---|
| 4,497,327 A * | 2/1985 | Hug et al. | 460/67 |
| 4,499,908 A * | 2/1985 | Niehaus | 460/108 |
| 4,706,690 A * | 11/1987 | Huhman | 460/84 |
| 4,733,672 A * | 3/1988 | Tophinke | 460/80 |
| 4,739,773 A * | 4/1988 | West et al. | 460/16 |
| 4,741,349 A * | 5/1988 | Roderfeld et al. | 460/66 |
| 4,875,891 A * | 10/1989 | Turner et al. | 460/110 |
| 5,112,279 A * | 5/1992 | Jensen et al. | 460/69 |
| 5,334,093 A * | 8/1994 | Jensen et al. | 460/83 |
| 5,356,338 A * | 10/1994 | Braunhardt et al. | 460/69 |
| 5,364,306 A * | 11/1994 | Soots et al. | 460/68 |
| 5,445,563 A * | 8/1995 | Stickler et al. | 460/69 |
| 5,913,724 A * | 6/1999 | Roberg | 460/83 |
| 6,152,820 A * | 11/2000 | Heidjann et al. | 460/112 |
| 7,473,170 B2 * | 1/2009 | McKee et al. | 460/109 |

FOREIGN PATENT DOCUMENTS

| | | |
|---|---|---|
| DE | 102006040979 A1 | 3/2008 |
| EP | 0631716 A1 | 6/1994 |
| EP | 1894465 A | 3/2008 |

* cited by examiner

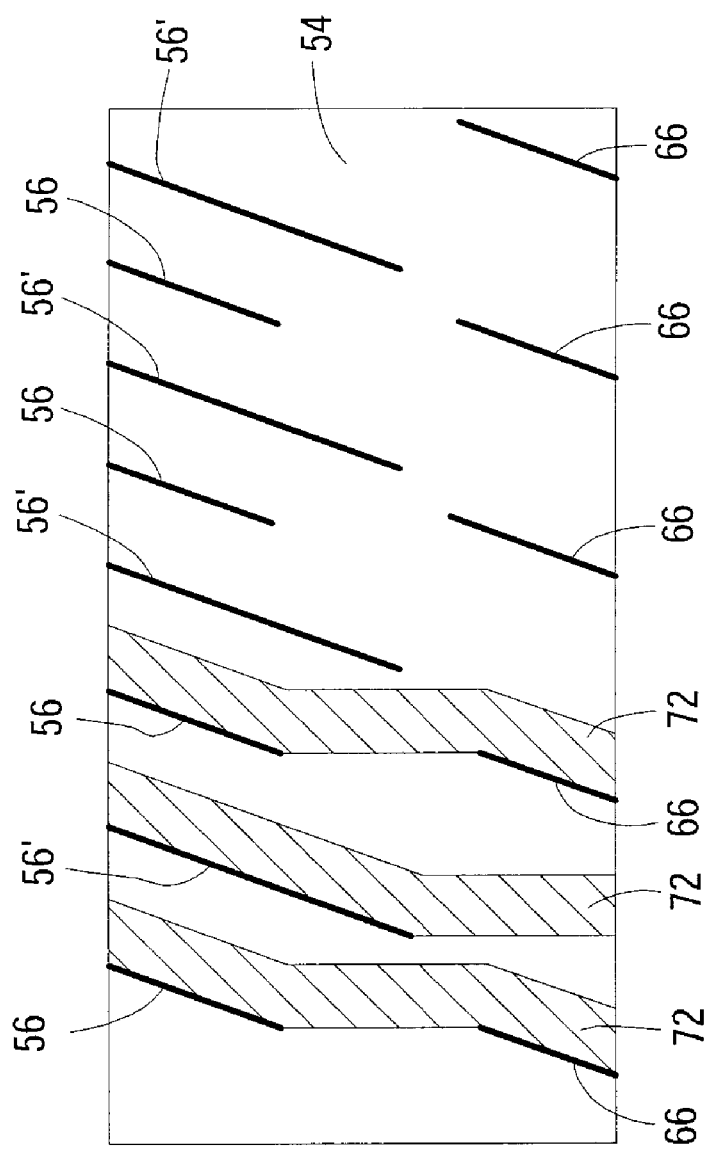
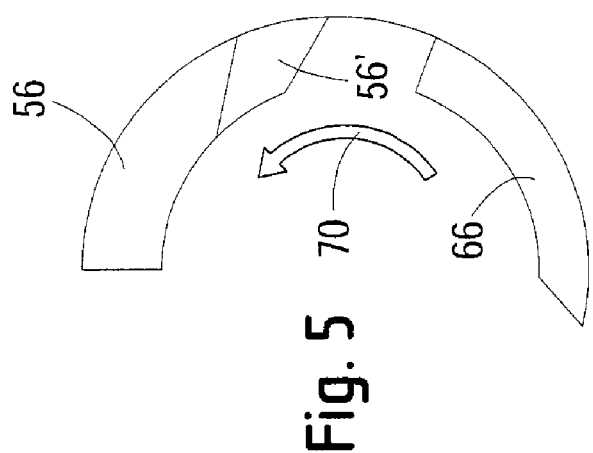
Fig. 4
Fig. 5

HARVESTED CROP PROCESSING UNIT WITH NUMBER OF CIRCULATION CIRCUITS DEPENDING ON THROUGHPUT

FIELD OF THE INVENTION

The present invention relates to agricultural combines, and, more particularly, to harvested crop processing units.

BACKGROUND OF THE INVENTION

Agricultural combines are large machines that harvest, thresh, separate and clean the agriculturally planted harvested crop which carries corn. The clean corn obtained in this way is stored in a corn tank on the combine. Rotary combines use one or two rotors enclosed in a rotor housing as a harvested crop processing arrangement to thresh and separate the harvested crop. The rotors are provided with a charging section that accepts harvested crop that had been harvested from the field, a threshing section to thresh the harvested crop received from the charging section and a separating section to release the corn that is still contained in the harvested crop after the threshing in the threshing section. During the rotation of the rotor the harvested crop is moved in the longitudinal direction from the charging section through the threshing section of the rotor to the separating section. In the separating section the axial movement of the harvested crop is obtained from helically shaped guide rails that are arranged underneath the cover element of the rotor housing. Hybrid combines are also known in which a threshing drum is arranged in the transverse direction upstream of one or two separating rotors which operates on the tangential flow principle. These are used to separate the corn from the threshed out harvested crop that are comparable to the separating section of the rotors of the rotary combines in their configuration and function.

The dwell time of the harvested crop in the separating rotor or the separating section of the crop processing unit is a function of the slope of the guide rails, that is, the positioning angle between the guide rails and the radius of the rotor. The number and the positioning angle of the guide rails are optimized for a certain volume throughput of harvested crop so that at a predetermined volume throughput a maximum separating capacity can be attained. Since many kinds of harvested crop can be accompanied by a significantly lower proportion of straw than other kinds of harvested crop, and the proportion of straw also is a function of the variable height of cut, in many cases the predetermined volume throughput is not reached. If less than the predetermined volume throughput runs through the separating rotor or the separating section, the harvested crop can run through the separating rotor or the separating section faster than desired to the end of the separating rotor or the separating section, and a large proportion of corn is lost to the harvesting process. Therefore in the case of low straw proportions or low throughput values it may be useful to exchange the cover elements of the separating rotor or the separating section (see EP 0 631 716 A) or to change the slope of the guide rails or the length of path over which they are in contact with the harvested crop (see U.S. Pat. No. 4,244,380 A, U.S. Pat. No. 4,258,726 A and the subsequently published DE 10 2006 040 979 A). Both of these possibilities are costly technically and subject to operator error.

DE 35 37 959 A which is seen as forming a class describes a combine with a tangential threshing drum that is followed by a separating rotor which is provided with two groups of guide rails that follow each other alternately. In order to avoid a jam resulting from the impact of the harvested crop upon the guide rails, the leading ends of a group of guide rails are provided with a ramp and are offset to each other in the circumferential direction, while the trailing ends of both groups lie in a straight line. The slope of the guide rails is dimensioned in such a way that the leading ends of each group of guide rails coincide with the trailing ends of each group of the following guide rails in the axial direction of the rotor.

What is needed in the art is a harvested crop processing unit of the kind cited initially that makes it possible by simple ways to permit harvested crop throughput values lower than a predetermined value to obtain sufficient dwell time in the harvested crop processing unit.

SUMMARY OF THE INVENTION

The present invention provides a harvested crop processing unit with a rotor and a rotor housing enclosing the rotor, that includes a cover element below which a first group of helical shaped guide rails and a second group of helically shaped guide rails are arranged, where the guide rails of the two groups follow each other alternately and are each provided with a leading end and a trailing end in the direction of rotation of the rotor and where the leading ends of the guide rails of the first group are arranged offset to the rear in the direction of rotation of the rotor relative to the leading ends of the second group of guide rails.

Stated another way, a harvested crop processing unit particularly configured as a separating rotor of a hybrid combine or a separating section of an axial threshing and separating arrangement of an axial combine includes a rotor and a rotor housing that is equipped with a cover element underneath which two groups of helically shaped guide rails are located. The two groups of guide rails follow each other alternately. The leading ends of all guide rails of the first group are offset to the rear in the direction of rotation of the rotor relative to the leading ends of all the guide rails of the second group. The trailing ends of the guide rails of the first group are directed in the axial direction of the rotor housing at the leading ends of the guide rails of the second group following in the axial direction of the rotor. This may be the immediately following guide rail of the second group or the over-, third-, etc. following of the second group of guide rails.

In this way the result is that the harvested crop is conveyed to the rear alternately by the guide rails of the first group and the guide rails of the second group in the case of a volume throughput below a threshold volume, since it is delivered to the leading end of the guide rails of the second group by the trailing end of the guide rails of the first group (after a circuit of the underside of the rotor). Since the leading ends of the guide rails of the second group are located ahead of the leading ends of the guide rails of the first group in the direction of rotation of the rotor the guide rails of the second group include one part of the harvested crop reaching the guide rails of the first group at smaller volume throughput values at volume throughput values above the threshold values, so that this part of the harvested crop then does not interact with the guide rails of the first group and therefore performs a smaller number of circuits of the rotor housing (in comparison to volume throughput values below the threshold value). The threshold value is determined by the axial distance between the leading ends of the guide rails of the first group and the leading end of guide rails of the second group. In other words, the flow of harvested crop spreads out with increasing volume throughput values and the guide rails of the second group receive a part of it upon exceeding the threshold value and that part reaches the outlet faster, since this part interacts only with the guide rails of the second group but not the guide rails of the first group.

Thereby the result is that volume throughput values below the threshold perform predetermined number of circuits through the harvested crop processing unit. At greater volume throughput values the guide rails of the second group convey a part of the harvested crop with a smaller number of circuits and therefore at a higher axial velocity to the output of the harvested crop processing unit. Thereby an overload of the rotor housing with harvested crop or with straw is avoided and an appropriate separating performance is attained as well as losses of harvested crop avoided. A repositioning of the guide rails or a determination of the actual throughput values is not required.

In a possible embodiment a third group of guide rails is used whose leading ends are directed in the axial direction of the rotor housing towards the trailing ends of the guide rails of the second group, and whose trailing ends are directed at the leading ends of the guide rails of the first group in the axial direction of the rotor housing. The guide rails of the third group operate effectively as extensions of the first group of guide rails.

Alternatively the guide rails of the third group can be omitted. Then the trailing ends of the guide rails of the second group are appropriately directed towards the leading ends of the guide rails of the first group of the particular following guide rails in the axial direction of the rotor housing.

The slope of the guide rails of the first group preferably agrees with the slope of the guide rails of the second group and, if necessary, with the slope of the guide rails of the third group. However, differing slopes for the individual groups or even for the guide rails within the groups could be used.

BRIEF DESCRIPTION OF THE DRAWINGS

FIG. 4 shows a plan view of a first embodiment of a cover of the rotor housing with a relatively low harvested crop throughput;

FIG. 5 shows a front view of the guide rails attached to the underside of the cover;

DETAILED DESCRIPTION OF THE INVENTION

Figure 1:
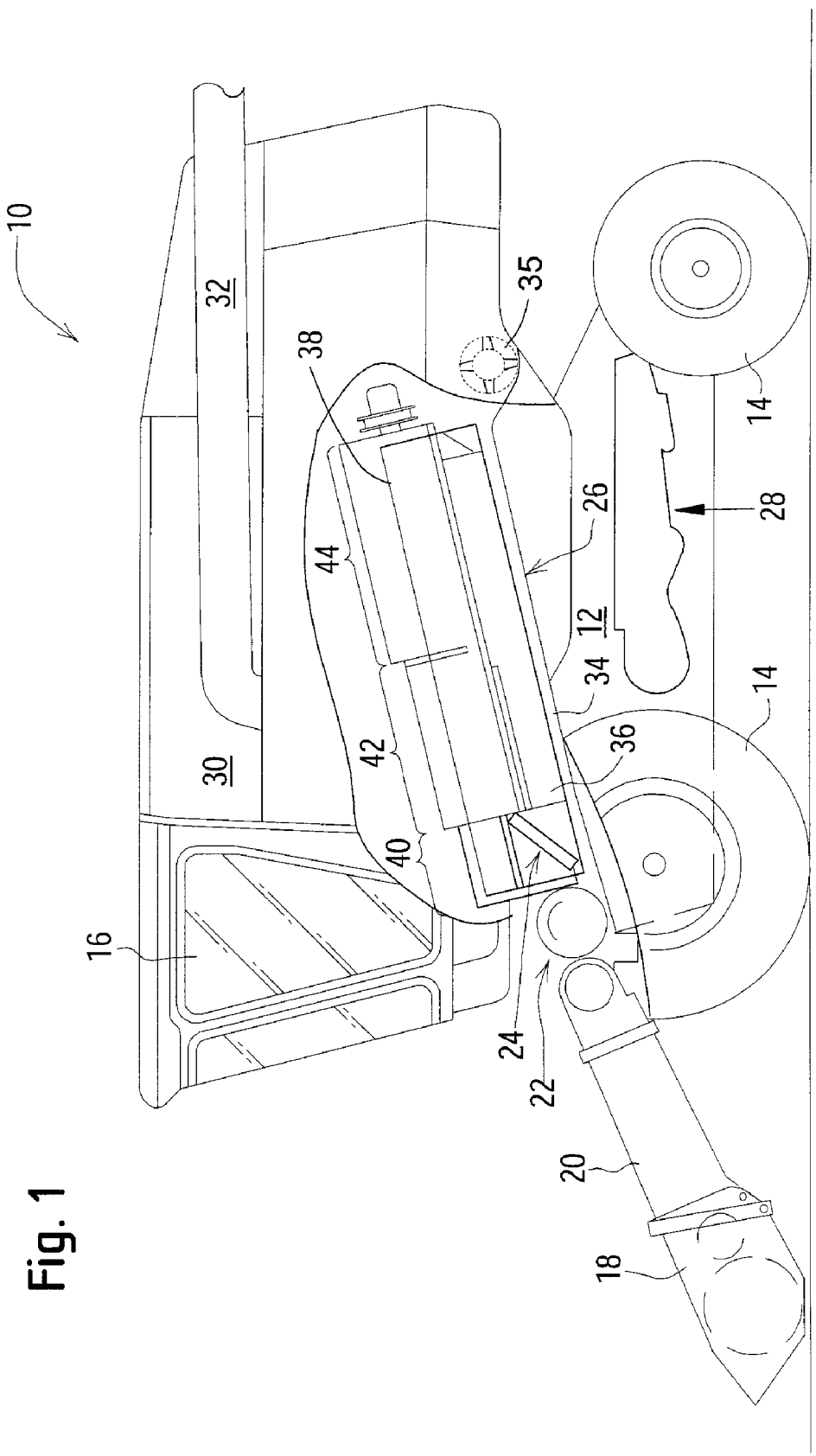
FIG. 1 shows a partial section of a side view of a combine with an axial harvested crop processing unit.

Referring now to the drawings, and more particularly to FIG. 1, there is shown an agricultural combine 10 with a supporting structure 12 with wheels 14 in contact with the ground that are fastened to the structure 12. The operation of the combine 10 is controlled from an operator's cab 16. A cutter head 18 is used to cut harvested crop containing corn and to conduct it to a slope conveyor 20. The harvested crop is conducted by the slope conveyor 20 to a guide drum 22. The guide drum 22 guides the harvested crop through an inlet transition section 24 to an axial harvested crop processing unit 26.

The harvested crop processing unit 26 includes a rotor housing 34 and a rotor 36 arranged within it. The rotor 36 includes a hollow drum 38 to which harvested crop processing elements are fastened for a charging section 40, a threshing section 42 and a separating section 44. The charging section 40 is arranged on the forward side of the axial harvested crop processing unit 26. The threshing section 42 and the separating section 44 are located downstream and to the rear of the charging section 40 in the longitudinal direction. In the charging section 40 the drum 38 is in the form of a truncated cone. The threshing section 42 includes a forward section in the form of a truncated cone and a cylindrical rear section. The cylindrical separating section 44 of the drum 38 is located at the end of the axial harvested crop processing unit 26.

Corn and chaff that fall through a threshing basket 46 and a separating grate 48 are conducted to a cleaning system 28 with a blower and disk-shaped sieves that can be brought into an oscillating movement. The cleaning system 28 removes the chaff and conducts the clean corn to a clean corn elevator (not shown). The clean corn elevator deposits the clean corn in a corn tank 30. The clean corn in the corn tank 30 can be unloaded by way of an unloading screw conveyor 32 to a corn wagon, trailer or truck. Straw that was threshed out and is leaving the separating section is ejected through an outlet of the harvested crop processing unit 26 and delivered to a conveyor drum 35. The conveyor drum 35, in turn, ejects the straw at the rear side of the combine 10, if necessary, after passing through a straw chopper (not shown).

Figure 2:
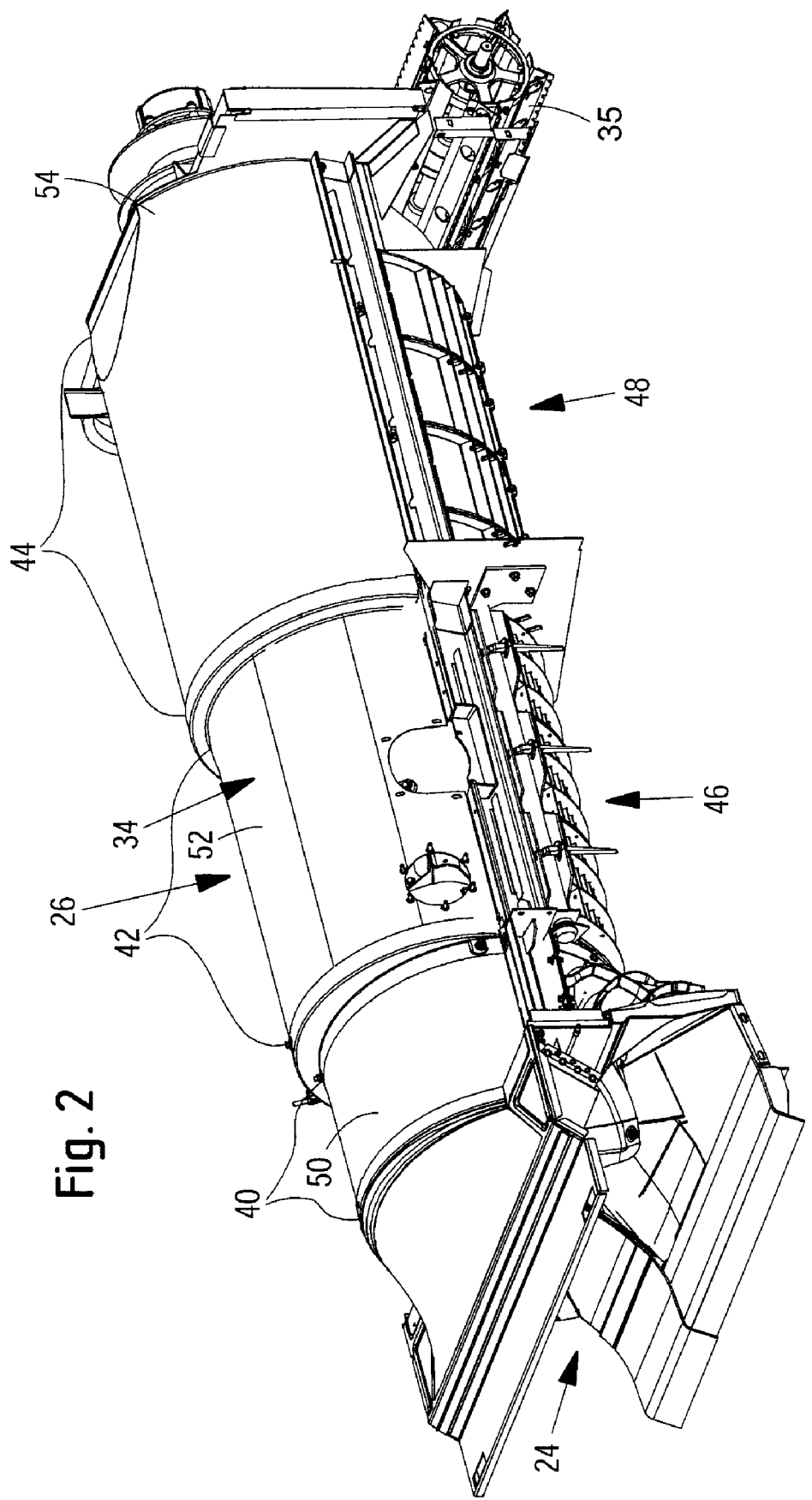
FIG. 2 shows a perspective view of the housing of the harvested crop processing unit.

Reference will now be made to FIG. 2. Under the threshing section 42 the underside of the rotor housing 34 is provided with a grate identified as a threshing basket 46. The separating grate 48 is located underneath the separating section 44. The rotor housing 34 is closed underneath the charging section 40. Cover elements 50, 52, 54 with semicircular cross section are arranged on the upper side of the rotor housing 34, each of which is associated with the charging section 40, the threshing section 42 and the separating section 44. The cover element 52 of the threshing section 42 is arranged eccentrically to the axis of rotation of the rotor 36, as is the cover element 54 of the separating section 44, whose eccentricity is greater than the eccentricity of the cover element 52 of the threshing section 42. Helically shaped guide rails 56 are located underneath the underside of the cover element 54 of the separating section 44.

Figure 3:
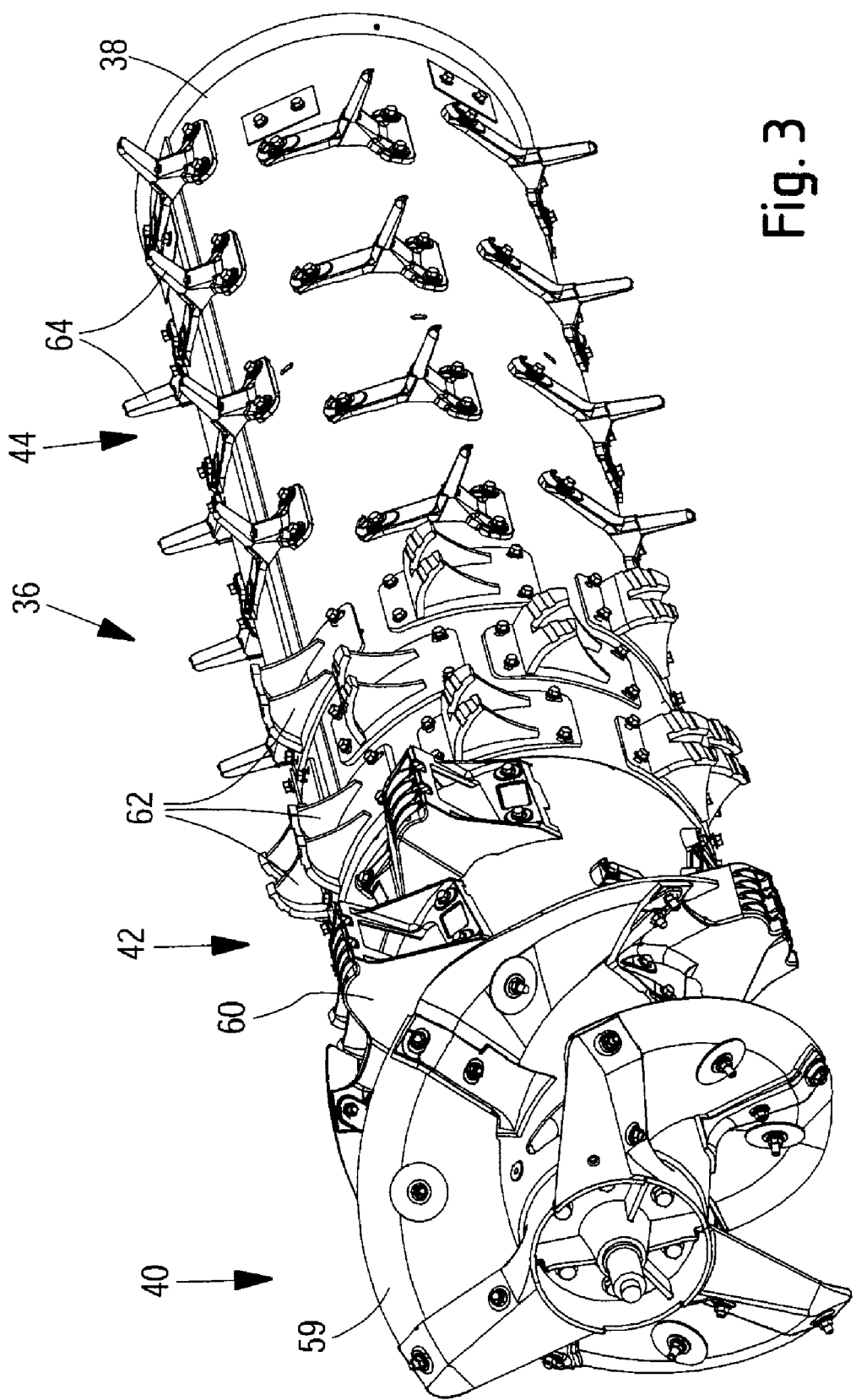
FIG. 3 shows a perspective view of the rotor.

As is shown in FIG. 3, the charging section 40 of the rotor 36 is equipped with helically shaped charging elements 59 in order to grasp the harvested crop received from the guide drum 22. The threshing section 42 of the harvested crop processing unit 26 is equipped with a number of threshing tines 60, 62 for the threshing of the harvested crop received from the charging section. The corn that was threshed in the threshing section 42 and broken loose is separated by separating fingers 64 from harvested crop other than corn in the separating section 44 that lift and separate the crop other than corn.

FIGS. 4 and 5 show a plan view and a cross section at right angles to the direction of operation through the cover element 54 of the separating section 44. The direction of rotation of the rotor 36 is indicated by the arrow 70 and the direction of flow of the harvested crop in the harvested crop processing unit 26 is indicated by the arrow 68.

Guide rails 56, 56' and 66 are arranged immediately underneath the cover element 54. Three groups of guide rails are provided: a first group of guide rails 56 that extend approximately over the downstream one-third of the cover element 54 as seen in the direction of rotation of the rotor 36, a second group of guide rails 56' that is arranged to alternate with the first group of guide rails 56 and extends a little more than one-half on the downstream side of the cover element 54 (shown as 60% in the illustration), and a third group of guide rails 66 that extend over approximately the upstream quarter of the cover element 54 in the direction of rotation of the rotor 36.

The ends of the guide rails 66 of the third group located upstream, as seen in the direction of rotation of the rotor 36, are located in the axial direction of the rotor housing 34 at the same height as the downstream end of the guide rails 56' of the second group (except for the most forward guide rail 66). The downstream ends of the guide rails 66 of the third group, as seen in the direction of rotation of the rotor 36, are located in the axial direction of the rotor housing 34 at the level of the upstream end of the guide rails 56 of the first group. The downstream ends of the guide rails 56 of the first group as seen in the direction of rotation of the rotor 36, are located in the axial direction of the rotor housing 34 at the level of the upstream ends of the guide rails 56' of the second group. The slopes of all the guide rails 56, 56' and 66 are identical.

Figure 6:
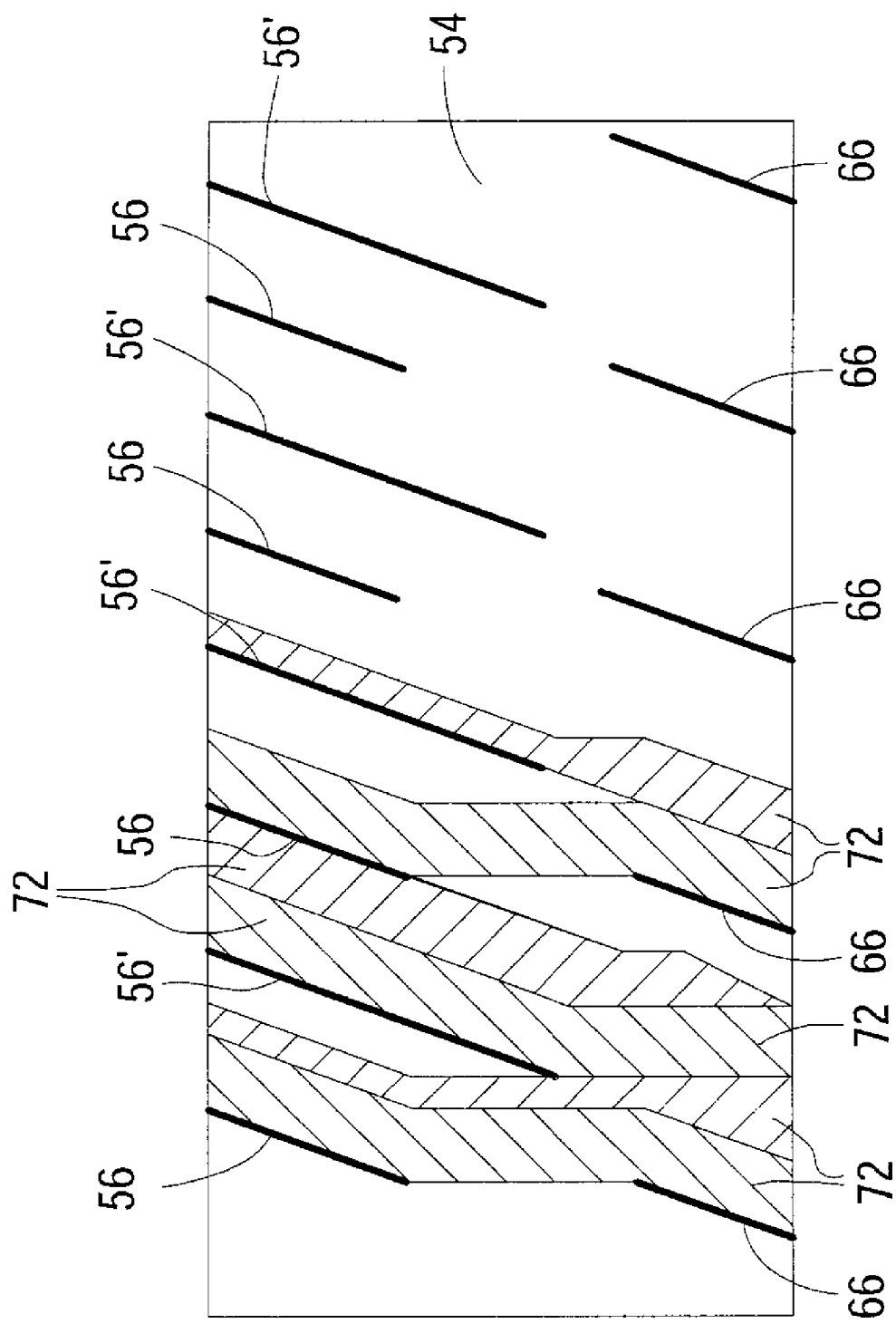
FIG. 6 shows a plan view of the cover of FIG. 4 with a greater harvested crop throughput.

The method of operation of the guide rails can be seen in FIGS. 4 and 6. FIG. 4 shows the situation at a relatively low flow of harvested crop; the harvested crop is identified by the part number call-out 72. Here it can be seen that the harvested crop 72 is guided to the rear in the axial direction of the rotor housing 34 continuously alternately by the guide rails 66 of the third group, the guide rails 56 of the first group and by the guide rail 56' of the second group. In the circuit through the lower part of the rotor housing 34, not shown in the figures, the harvested crop 72 is conducted not in the axial direction of the rotor housing 34 but tangentially along the separating grate 48. The harvested crop performs a total of eight circuits through the rotor housing 34.

As soon as the volume throughput exceeds a threshold value, that is determined by the distance between the leading ends of the guide rails 56 of the first group and the leading ends of the guide rails 56' of the second group in the axial direction of the rotor housing 34, the result is the situation shown in FIG. 6. It can be seen that one part of the incoming flow of harvested crop 72 is delivered by the forward guide rail 66 of the third group and is taken over directly by the forward guide rail 56' of the second group—since the leading ends of the guide rails 56' of the second group are offset in the direction of rotation of the rotor 36 relative to the leading ends of the forward guide rails 56 of the first group and are directed at the trailing ends of the guide rails 56 of the first group— (and they are not grasped by the guide rails 56 of the first group). Accordingly the part of the harvested crop 72 that exceeds the threshold value interacts only with the guide rails 56' of the second group and performs only four circuits through the rotor housing. Thereby at greater harvested crop throughput values an overload of the harvested crop processing unit 26 is avoided, while smaller harvested crop throughput values remain longer in the unit and therefore achieve an optimum separating result.

Figure 7:
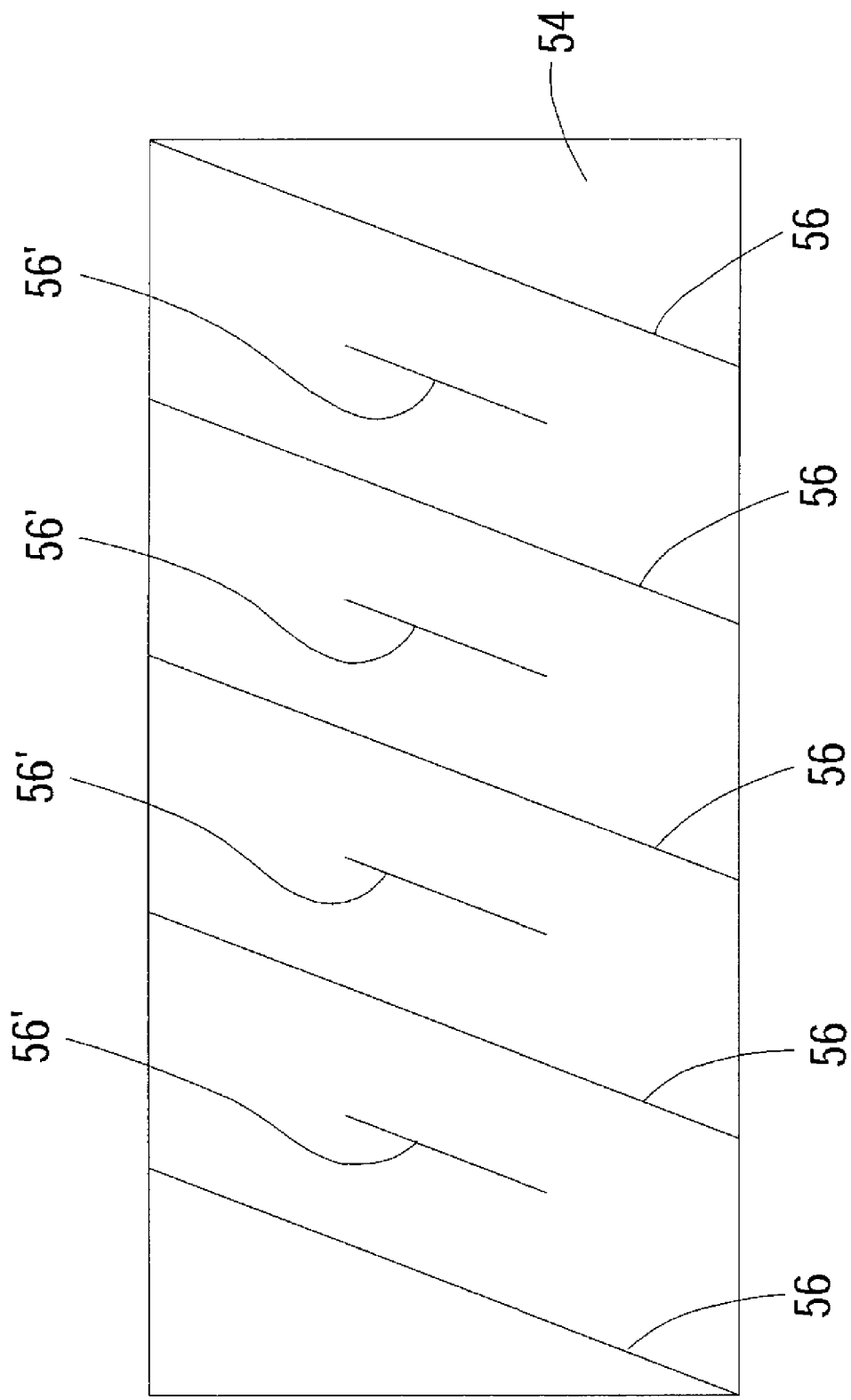
FIG. 7 shows a plan view of a second embodiment of a cover of the rotor housing.

FIG. 7 shows a second embodiment of a cover element 54. Here two groups of guide rails 56, 56' are used, where the guide rails 56 of the first group extend over the entire width of the cover element 54, while the guide rails 56' of the second group extend only over approximately the central third of the cover element 54. The downstream ends of the guide rails 56 of the first group, as seen in the direction of rotation of the rotor 36, are located at the level of the upstream ends of the guide rails 56' of the second group as seen in the axial direction of the rotor housing 34. The downstream ends of the guide rails 56' of the second group as seen in the direction of rotation of the rotor 36 are located at the level of the upstream ends of the guide rails 56 of the first group as seen in the axial direction of the rotor housing 34. The slopes of all the guide rails 56, 56', 66 are identical.

The method of operation of the second embodiment corresponds to that of the first embodiment, so that at a threshold value of the flow of the harvested crop it is guided alternately by the guide rails 56 of the first group and by the guide rail 56' of the second group to the rear to the outlet, at a value of the flow of harvested crop as determined by the spacing between the leading ends of the first group 56 and the leading ends of the second group 56' as seen in the axial direction of the rotor housing 34. If the threshold value is exceeded only a part of the harvested crop is conveyed only by the guide rails 56' of the second group so that the dwell time in the harvested crop processing unit 26 is shorter than with the remaining harvested crop.

Figure 8:
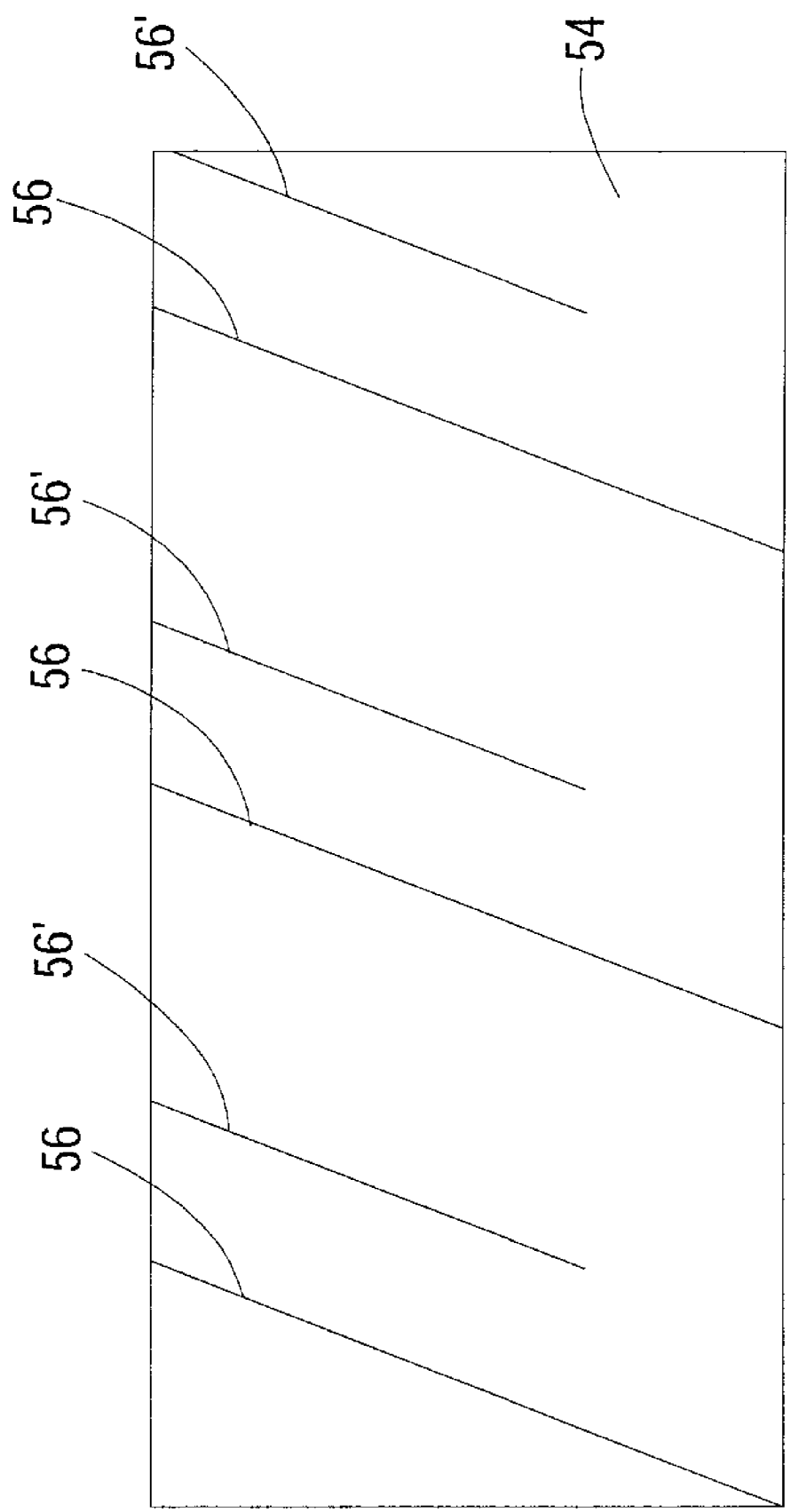
FIG. 8 shows a plan view of a third embodiment of a cover of the rotor housing.

The third embodiment, according to FIG. 8, differs from the second embodiment only in the fact that the guide rails 56' of the second group extend over the downstream two-thirds of the cover element 54.

Having described the preferred embodiment, it will become apparent that various modifications can be made without departing from the scope of the invention as defined in the accompanying claims.

The invention claimed is:

1. A harvested crop processing unit, comprising:
   a rotor;
   a first group of helically shaped guide rails;
   a second group of helically shaped guide rails; and
   a rotor housing enclosing said rotor, said rotor housing including a cover element underneath which said guide rails of said first group and said guide rails of said second group are attached thereto, said guide rails of both said groups following each other alternately and each including a leading end and a trailing end as seen in a direction of rotation of said rotor, said leading ends of said guide rails of said first group being arranged offset to a rear in said direction of rotation of said rotor relative to said leading ends of said guide rails of said second group, said trailing ends of said guide rails of said first group being directed in an axial direction of said rotor housing at said leading ends of said guide rails of said second group that are immediately following as seen in said axial direction of said rotor housing.

2. The harvested crop processing unit according to claim 1, further comprising a third group of guide rails each including a leading end and a trailing end, said leading ends of said guide rails of said third group being directed at said trailing ends of said guide rails of said second group in said axial direction of said rotor housing, said trailing ends of said guide rails of said third group being directed at said leading ends of said guide rails of said first group in said axial direction of said rotor housing.

3. The harvested crop processing unit according to claim 2, wherein a slope of said guide rails of said first group agrees with a slope of said guide rails of said second group.

4. The harvested crop processing unit according to claim 3, wherein said slope of said guide rails of said first group agrees with a slope of said guide rails of said third group.

5. The harvested crop processing unit according to claim 1, wherein said trailing ends of said guide rails of said second group are directed at said leading ends of immediately following said guide rails of said first group in said axial direction of said rotor housing.

6. The harvested crop processing unit according to claim 1, wherein said rotor and said rotor housing include a separating section that is associated with said cover element.

7. The harvested crop processing unit according to claim 1, wherein a harvested crop at volume throughput values below a threshold value is conveyed to a rear in said axial direction of said rotor housing successively through all said guide rails of said first and second groups, while one part of said harvested crop at volume throughput values above said threshold value does not interact with said guide rails of said first group and therefore performs a reduced number of circuits through said rotor housing as compared to said volume throughput values below said threshold value, said threshold value being determined by an axial distance between said leading ends of said guide rails of said first group and said leading ends of said guide rails of said second group.

8. The harvested crop processing unit according to claim 2, wherein said guide rails of said first group extend approximately over a downstream one-third of said cover element as seen in said direction of rotation of said rotor, said guide rails of said second group extending over approximately 50-60% of said cover element including all of a downstream half of said cover element as seen in said direction of rotation of said rotor, said guide rails of said third group extending over approximately an upstream quarter of said cover element in said direction of rotation of said rotor.

9. The harvested crop processing unit according to claim 1, wherein said guide rails of said first group extend over an entire width of said cover element, said guide rails of said second group extending only over approximately a central third of said cover element.

10. A combine, comprising:
   a harvested crop processing unit including:
      a rotor;
      a first group of helically shaped guide rails;
      a second group of helically shaped guide rails; and
      a rotor housing enclosing said rotor, said rotor housing including a cover element underneath which said guide rails of said first group and said guide rails of said second group are attached thereto, said guide rails of both said groups following each other alternately and each including a leading end and a trailing end as seen in a direction of rotation of said rotor, said leading ends of said guide rails of said first group being arranged offset to a rear in said direction of rotation of said rotor relative to said leading ends of said guide rails of said second group, said trailing ends of said guide rails of said first group being directed in an axial direction of said rotor housing at said leading ends of said guide rails of said second group that are immediately following as seen in said axial direction of said rotor housing.

11. The combine of claim 10, further comprising a third group of guide rails each including a leading end and a trailing end, said leading ends of said guide rails of said third group being directed at said trailing ends of said guide rails of said second group in said axial direction of said rotor housing, said trailing ends of said guide rails of said third group being directed at said leading ends of said guide rails of said first group in said axial direction of said rotor housing.

12. The harvested crop processing unit according to claim 11, wherein said guide rails of said first group extend approximately over a downstream one-third of said cover element as seen in said direction of rotation of said rotor, said guide rails of said second group extending over approximately 50-60% of said cover element including all of a downstream half of said cover element as seen in said direction of rotation of said rotor, said guide rails of said third group extending over approximately an upstream quarter of said cover element in said direction of rotation of said rotor.

13. The harvested crop processing unit according to claim 10, wherein said guide rails of said first group extend over an entire width of said cover element, said guide rails of said second group extending only over approximately a central third of said cover element.

* * * * *